J. D. JONES.
PISTON ROD.
APPLICATION FILED JAN. 22, 1917.
1,231,900.
Patented July 3, 1917.
3 SHEETS—SHEET 3.
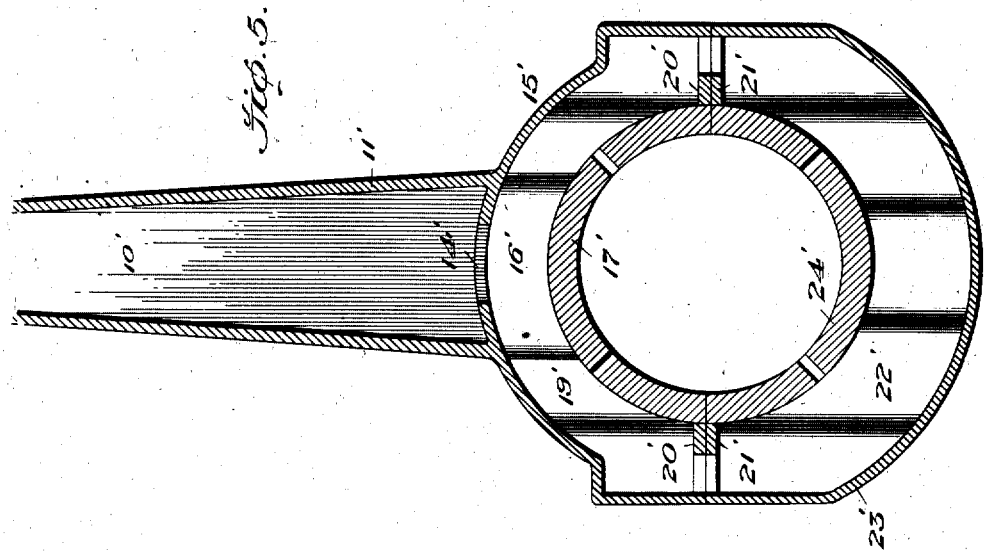
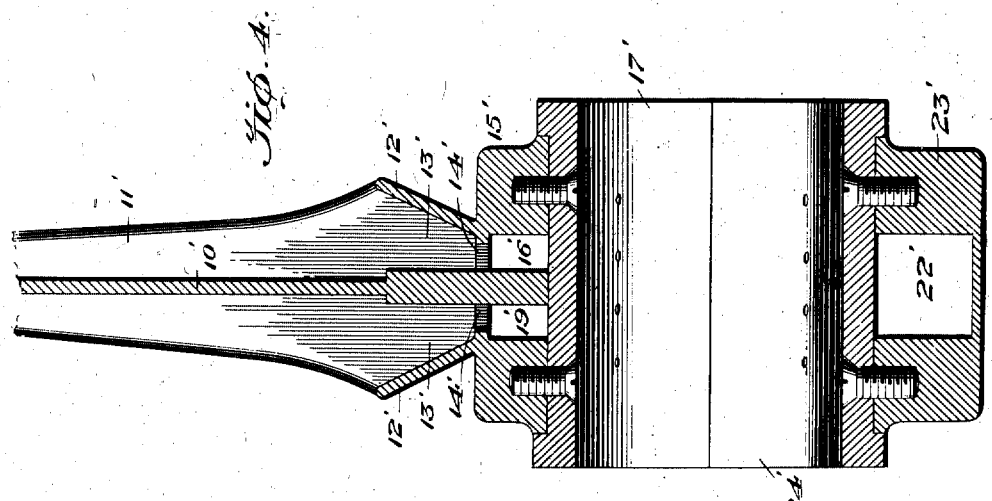
Witnesses
Inventor
John D. Jones
By David P. Moore
Attorney

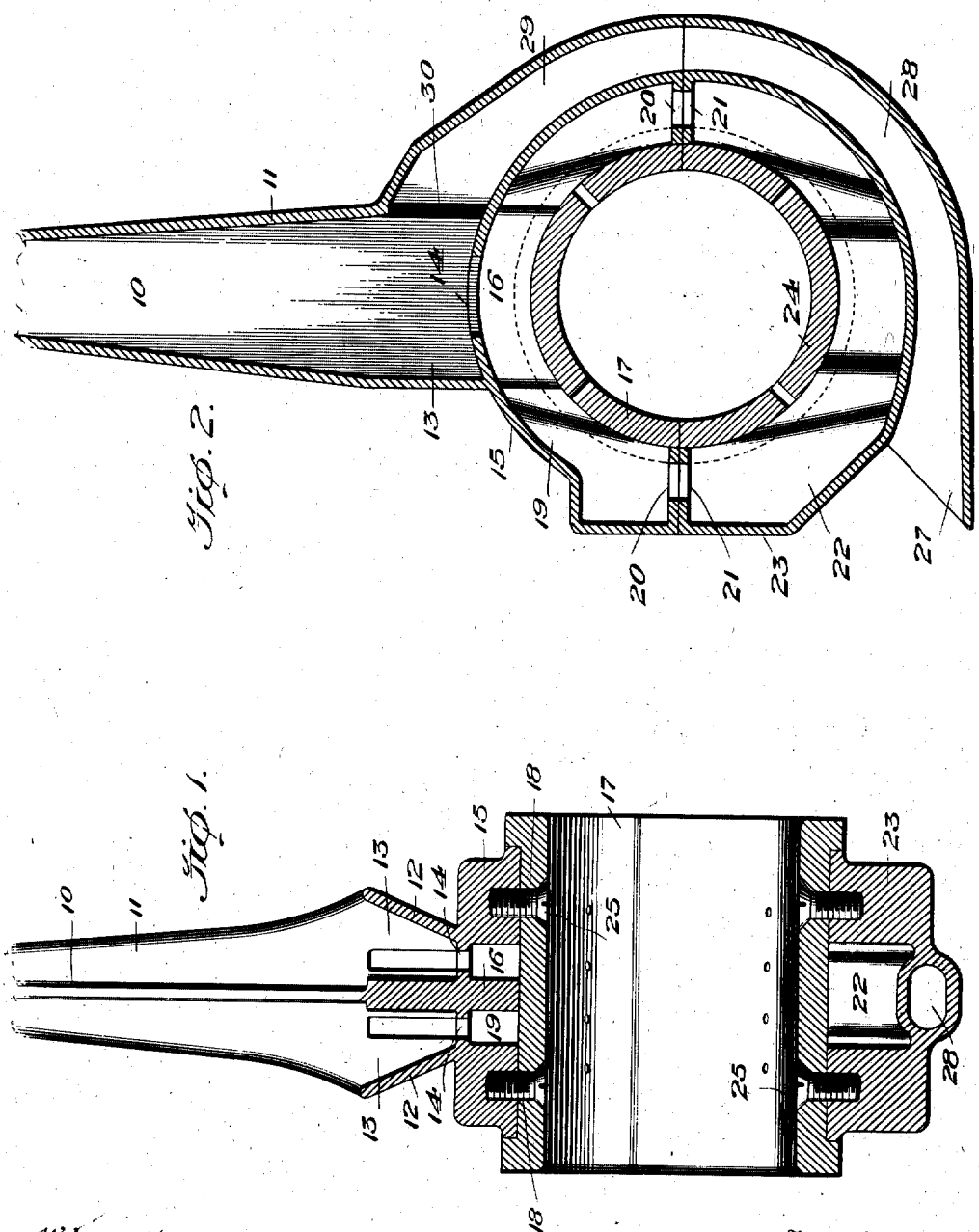

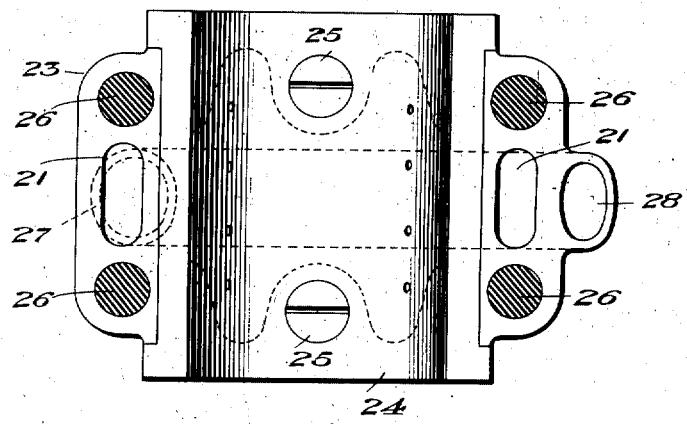
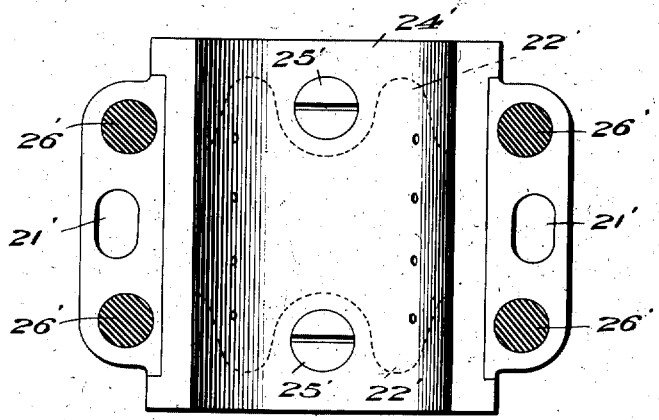

UNITED STATES PATENT OFFICE.

JOHN D. JONES, OF WALLA WALLA, WASHINGTON.

PISTON-ROD.

1,231,900.   Specification of Letters Patent.   Patented July 3, 1917.

Application filed January 22, 1917. Serial No. 143,771.

*To all whom it may concern:*

Be it known that I, JOHN D. JONES, a citizen of the United States, residing at Walla Walla, in the county of Walla Walla and State of Washington, have invented certain useful Improvements in Piston-Rods, of which the following is a specification, reference being had therein to the accompanying drawing.

This invention relates to improvements in piston rods, and more particularly to rods used in explosion engines, one object of the invention being the provision of an arrangement by means of which the connecting end for attaching to the crank shaft may be efficiently lubricated to reduce the friction and consequent wear upon the bushing of such connection.

A further object of this invention is the provision of an automatically lubricated crank shaft connection for piston rods by means of which an incased lubricant containing chamber is provided to encircle the bushing and supply lubricant therethrough to the crank shaft and to the bushing, the lubricant being supplied to said chamber during the movement of the crank shaft and piston rod in such a manner as to insure the proper dispensing of the lubricant which also tends to keep the frictional parts cooled.

With the foregoing and other objects in view and which will appear as the description of the invention proceeds, said invention consists of a novel combination and arrangement of parts hereinafter described and particularly pointed out in the claims, it being possible to change the detail construction which is only limited by the scope of what is claimed.

In the accompanying drawings:

Figure 1 is a longitudinal sectional view through the lower end of a piston rod constructed to and embodying the present invention.

Fig. 2 is a section taken at right angles to that shown in Fig. 1 and slightly to one side of the center web.

Fig. 3 is a plan view of the lower section of the connecting portion and the lower bushing.

Fig. 4 is a view similar to Fig. 1 of a modified form.

Fig. 5 is a view similar to Fig. 2 of the construction shown in Fig. 4.

Fig. 6 is a plan view of the lower section of the bushing and connecting member of that shown in Figs. 4 and 5.

Referring to the drawings, and more particularly to Figs. 1, 2, and 3, the corresponding parts in Figs. 4, 5, and 6, being primed, the numeral 10 designates the central web of the rod proper which has the usual flanges 11 which in this instance at the lower ends are connected together by means of the inclined wall 12 to provide the two lubricant receiving and delivering receptacles 13, one upon each side of the web 10 and each one of which is provided with its dispensing opening or aperture 14.

Formed integral with the web and flanges and the walls 12 is the upper section 15 of the connecting end of the rod which is also provided with the central segmental lug 16 which projects inwardly and provides with the section 15 and the upper section 17 of the bushing which is held in place by the screws 18, the lubricant receiving channel 19.

At opposite sides of the connecting section 15 is an apertured web 20 which alines with the apertured web 21 of the lower connecting section 23 which is provided with the lubricant receiving chamber 22 sealed upon the inner face upon the lower section 24 of the bushing. Thus the two bushings 17 and 24 form the inner closure for the annular chamber 19—22 formed by the two connecting portions 15 and 23 when the parts are assembled and held in locked position by the bolts 26. Screws 25 are provided to hold the section 24 in the connecting member 23.

Formed integral with both sections 15 and 23 is a scoop lubricating conveying member which consists of the inlet portion 27 and the two conveying portions 28 and 29 having the openings 30 into both of the receptacles 13.

It will thus be seen that as the present rod moves in the crank case in its usual circle that with the construction shown in Figs. 1 and 2, the spout 27 will dip into the lubricant within the crank casing and such lubricant by such action will be directed through the channels 28 and 29 and through the openings 30 into the receptacles 13 from whence it will be dispensed through the openings 14 into the annular chamber 19—22 to be finally directed through the apertured portions of the bushing 17—22 to the surrounding portion of the crank shaft, not shown.

Also in this construction any of the lubricant splashing inwardly upon the web of the rod and between the flanges 11 will fall by gravity into the receptacles 13 and pass in a similar manner into the annular chamber 19—22.

In the construction shown in Figs. 4 and 5, the annular chamber is the only one provided, this being illustrated to show how the scoop lubricating device may be dispensed with.

From the foregoing description it is evident that with a self-lubricating connection as herein set forth, that the bushing will be properly lubricated and by such lubricant surrounding the same be sufficiently cooled to consequently reduce the friction and wearing of the bushing.

Where found desirable only one receptacle 13 may be employed in which event the diaphragm lug 16 will be dispensed with, this lug acting as a directing means to insure the proper distribution of the lubricant for passage into the section 19 of the annular chamber.

What I claim as new is:

1. A piston rod having a crank shaft connecting end provided with a lubricant receiving chamber, and a bushing in the connecting end and forming the inner wall of said chamber.

2. A piston rod having a crank shaft connecting end provided with a lubricant receiving chamber, and a bushing in the connecting end and forming the inner wall of said chamber, and means for directing the lubricant to said chamber, said bushing being provided with lubricant outlets.

3. A piston rod having a sectional connecting end provided with an annular chamber, said chamber being provided with lubricant receiving openings adjacent the junction of the rod with the connecting end.

4. A piston rod having a sectional connecting end provided with an annular chamber, said chamber being provided with lubricant receiving openings adjacent the junction of the rod with the connecting end, and a bushing fitting in the connected end and forming the inner wall for the chamber, said bushing being provided with lubricant outlets.

5. A piston rod having a sectional connecting end provided with an annular chamber, said chamber being provided with lubricant receiving openings adjacent the junction of the rod with the connecting end, and an auxiliary lubricant directing member in communication with the inlet opening of the chamber and having its inlet disposed to scoop the lubricant during the movement of the rod.

6. A piston rod having a receptacle at the lower end of the rod, a sectional connecting end carried by the rod and provided with an annular lubricant receiving chamber, said chamber being in communication with the first receptacle, and a bushing having outlet ports forming the inner walls of the annular lubricant chamber.

7. A piston rod, having a receptacle at the lower end of the rod, a sectional connecting end carried by the rod and provided with an annular lubricant receiving chamber, said chamber being in communication with the first receptacle, a bushing having outlet ports forming the inner walls of the annular lubricant chamber, and an auxiliary scoop carried by the connecting end and having an inlet at the opposite side to the outlet, which outlet is in communication with said receptacle.

8. A piston rod having a central longitudinal web, two receptacles one upon each side adjacent one end of the web, a sectional connecting end, one section of which is formed integral with the web and the receptacles and is provided with an aperture in communication with said receptacles, the two sections of the connecting end being provided with an annular lubricant chamber, the inlet of which is said openings, and a sectional bushing mounted in the sections of the connecting ends and forming the inner walls of the chamber.

9. A piston rod having a central longitudinal web, two receptacles one upon each side adjacent one end of the web, a sectional connecting end, one section of which is formed integral with the web and the receptacles and is provided with an aperture in communication with said receptacles, the two sections of the connecting end being provided with an annular lubricant chamber, the inlet of which is said openings, a sectional bushing mounted in the sections of the connecting ends and forming the inner walls of the chamber, and an auxiliary lubricant distributing conduit carried by both sections of the connecting end and having an inlet exterior of one of the sections while the outlet thereof is in communication with both receptacles.

In testimony whereof I affix my signature.

JOHN D. JONES.